US011776290B2

(12) United States Patent
Mohapatra et al.

(10) Patent No.: US 11,776,290 B2
(45) Date of Patent: *Oct. 3, 2023

(54) DOCUMENT CLASSIFICATION USING SIGNAL PROCESSING

(71) Applicant: INTUIT INC., Mountain View, CA (US)

(72) Inventors: Deepankar Mohapatra, Plano, TX (US); Ronnie Douglas Douthit, Trinidad, TX (US)

(73) Assignee: INTUIT, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/809,071

(22) Filed: Jun. 27, 2022

(65) Prior Publication Data

US 2022/0327307 A1   Oct. 13, 2022

Related U.S. Application Data

(63) Continuation of application No. 17/218,281, filed on Mar. 31, 2021, now Pat. No. 11,409,981.

(51) Int. Cl.
*G06V 30/413* (2022.01)

(52) U.S. Cl.
CPC ........ *G06V 30/413* (2022.01); *G06F 2218/14* (2023.01); *G06F 2218/16* (2023.01)

(58) Field of Classification Search
None
See application file for complete search history.

(56) References Cited

U.S. PATENT DOCUMENTS

| | | | | |
|---|---|---|---|---|
| 6,115,497 A * | 9/2000 | Vaezi | ................... | G06V 30/414 382/168 |
| 6,574,375 B1 * | 6/2003 | Cullen | .................... | G06F 9/005 382/290 |
| 7,489,415 B2 * | 2/2009 | Furuta | ................ | G06V 30/1444 358/1.15 |
| 7,522,760 B1 * | 4/2009 | Will | ..................... | G06V 30/224 382/172 |
| 7,747,089 B2 * | 6/2010 | Mori | .................... | G06V 30/413 382/173 |
| 8,457,426 B1 * | 6/2013 | Agrawal | .............. | G06V 30/413 382/237 |
| 8,509,534 B2 * | 8/2013 | Galic | ................... | G06V 30/413 382/176 |
| 9,398,191 B2 * | 7/2016 | Saka | .................... | G06V 30/147 |

(Continued)

*Primary Examiner* — Anand P Bhatnagar
(74) *Attorney, Agent, or Firm* — Patterson + Sheridan, LLP

(57) ABSTRACT

Aspects of the present disclosure provide techniques for document classification through signal processing. Embodiments include receiving a document for classification. Embodiments include generating an image of the document. Embodiments include producing a signal representation of the document based on numbers of non-white pixels in each horizontal scan line or vertical scan line of the image of the document. Embodiments include comparing the signal representation of the document to signal representations of previously-classified documents. Embodiments include determining, based on the comparing, a classification for the document. Embodiments include performing additional processing with respect to the document based on the classification for the document.

18 Claims, 5 Drawing Sheets

(56) References Cited

U.S. PATENT DOCUMENTS

| | | | |
|---|---|---|---|
| 10,679,089 B2* | 6/2020 | Annis | G06V 30/414 |
| 10,740,638 B1* | 8/2020 | Annis | G06V 30/412 |
| 2002/0018071 A1* | 2/2002 | Ohnishi | G06V 30/412 |
| | | | 345/643 |
| 2004/0042659 A1* | 3/2004 | Guo | G06V 30/413 |
| | | | 382/176 |
| 2007/0286507 A1* | 12/2007 | Mori | H04N 19/60 |
| | | | 382/176 |
| 2009/0190168 A1* | 7/2009 | Furuta | G06V 30/1444 |
| | | | 358/1.15 |
| 2013/0114907 A1* | 5/2013 | Deng | G06F 16/5838 |
| | | | 382/218 |
| 2015/0222730 A1* | 8/2015 | Gower | H04L 67/01 |
| | | | 709/203 |

* cited by examiner

DOCUMENT CLASSIFICATION USING SIGNAL PROCESSING

CROSS-REFERENCE TO RELATED APPLICATIONS

This Application is a continuation of co-pending U.S. patent application Ser. No. 17/218,281, filed Mar. 31, 2021, the contents of which are incorporated herein by reference in their entirety.

INTRODUCTION

Aspects of the present disclosure relate to techniques for improved document classification through the use of signal processing algorithms.

Every year millions of people, businesses, and organizations around the world use computer software to help manage aspects of their lives. For example, software applications may provide financial management functionality, such as accounting and tax preparation services.

As the number of software applications available for performing various tasks continues to multiply, the ability to classify data within an application is becoming increasingly important. For example, a software application may allow documents to be imported for use within the application. The application may attempt to determine a classification of each imported document so that various classification-based actions may be performed with respect to the document, such as extracting data from the document or providing the user with help content related to the document.

Conventional document classification techniques have certain drawbacks. For example, manual classification of documents is time-consuming and inconvenient, and model-based classification based on recognized words in documents has proven ineffective for documents with sparse text. For example, many tax-related documents have few words, and are better recognized by their layout.

Other existing techniques involve image-based classification. For example, an image-based classification model such as a convolutional neural network (CNN) may be trained to classify images of documents. However, these techniques are resource-intensive and require extensive amounts of training data. Furthermore, while these techniques tend to work well for single-page documents, they do not work well for multi-page documents because image-based classification models generally require uniformly-sized input. Consequently, if one document has 2 pages and another document has 32 pages, it is impractical to scale these two inputs to match because scaling a 32 page document to 2 pages results in a significant loss in resolution. Modifying the model to handle 32 page input, on the other hand, can cause the model to become so large that training requires extraordinary processing and memory resources and may nevertheless perform poorly on input of variable page count.

What is needed is a technical solution for improved classification of documents that is effective for documents with sparse text as well as multi-page documents without requiring significant processing and memory resources.

BRIEF SUMMARY

Certain embodiments provide a method for document classification through signal processing. The method generally includes: receiving a document for classification; generating an image of the document; producing a signal representation of the document based on numbers of non-white pixels in each horizontal scan line or vertical scan line of the image of the document; comparing the signal representation of the document to signal representations of previously-classified documents; determining, based on the comparing, a classification for the document; and performing additional processing with respect to the document based on the classification for the document.

Other embodiments provide a system comprising one or more processors and a non-transitory computer-readable medium comprising instructions that, when executed by the one or more processors, cause the system to perform a method for document classification through signal processing. The method generally includes: receiving a document for classification; generating an image of the document; producing a signal representation of the document based on numbers of non-white pixels in each horizontal scan line or vertical scan line of the image of the document; comparing the signal representation of the document to signal representations of previously-classified documents; determining, based on the comparing, a classification for the document; and performing additional processing with respect to the document based on the classification for the document.

Other embodiments provide a method for document classification through signal processing. The method generally includes: receiving a plurality of documents associated with classifications; generating images of the plurality of documents; producing signal representations of the plurality of documents based on numbers of non-white pixels in each horizontal scan line or vertical scan line of each image of the images of the plurality of documents; associating the classifications with the signal representations of the plurality of documents; comparing a signal representation of a previously unclassified document to the signal representations of the documents; determining, based on the comparing, a classification for the previously unclassified document; and performing additional processing with respect to the previously unclassified document based on the classification for the previously unclassified document.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
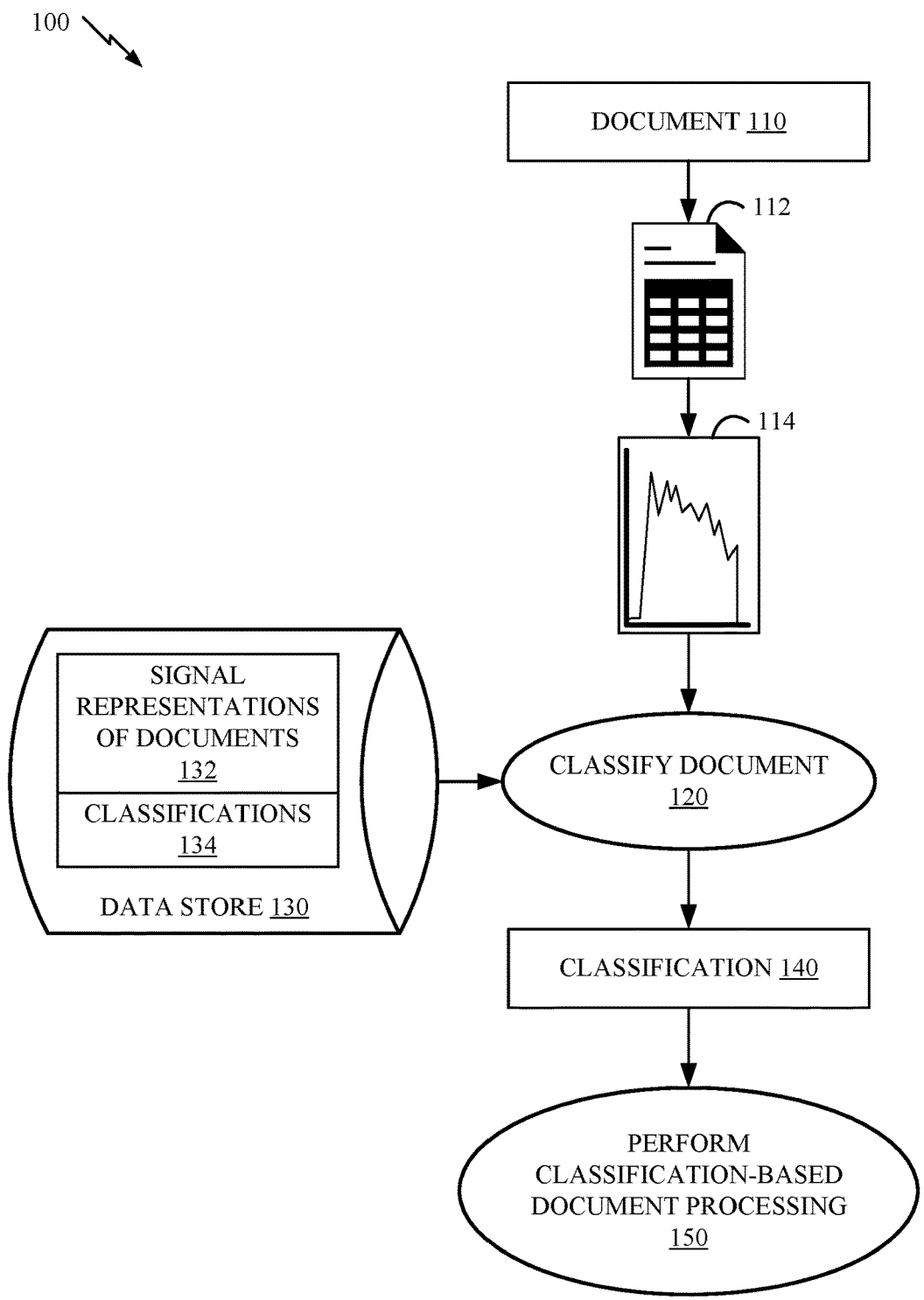
FIG. 1 depicts an example related to document classification through signal processing.

Aspects of the present disclosure provide apparatuses, methods, processing systems, and computer-readable mediums for document classification using signal processing techniques. These aspects provide a technical solution to the aforementioned technical problems with conventional document classification techniques.

In particular, techniques described herein allow for improved classification of documents, including documents with sparse text and multiple pages. According to certain embodiments, a signal representation of a document is generated based on an image of the document. The signal representation includes a time series of signal amplitude values. For example, the time-series may correspond to horizontal scan lines or vertical scan lines (e.g., horizontal scan lines or vertical scan lines) in the image of the document, and the signal amplitude value for each horizontal scan line or vertical scan line may indicate a number of non-white pixels in the horizontal scan line or vertical scan line. For a multi-page document, all pages may be included in a single image or each page may be included in a separate image, and the signal representation may represent numbers of non-white pixels in each horizontal scan line or vertical scan line of each page of the document, such as indicating a total number of non-white pixels in each horizontal scan line or vertical scan line across all pages, an average number of non-white pixels in each horizontal scan line or vertical scan line across all pages, or including separate signal representations of each page.

When a document is received for classification, such as by being imported by a user, a signal representation of the document is generated and compared to signal representations of documents for which classifications are known. In some embodiments dynamic time warping (DTW) techniques are used to compare the signal representations in order to account for differences in numbers of pages between documents. DTW techniques are algorithms for measuring similarity between two temporal sequences, which may vary in "speed" (or some other aspect represented in the time dimension, such as pages). The sequences are "warped" non-linearly in the time dimension to determine a measure of their similarity independent of certain non-linear variations in the time dimension. Non-linear in this context refers to the time dimension, which corresponds to either the vertical scan line index or the horizontal scan line index according to techniques described herein. DTW has a time window that provides forward and backward matching, which allows Y sequences (e.g., corresponding to numbers of non-white pixels) to be identified even when the corresponding X sequences (e.g., corresponding to horizontal scan line indices or vertical scan line indices) may be spaced differently. In document classification, this non-linear matching is useful because it allows matching in two common scenarios: resolution differences and additions/deletions of document sections/pages. If two signal representations of the same document but with different resolutions are compared, the shape of the signal will be the same but the time scale will be compressed. Similarly, if two signal representations of the same multi-page document, but with an extra page in the middle, are compared, the shapes will look the same but with an extra added signal in the middle. Because DTW can match Y sequences even when X sequences aren't linearly spaced, it can match, for example, pages 1 and 2 of the original document with pages 2 and 3 of the second document.

If a match is found between the signal representation of the document and a signal representation of a previously-classified document, such as when a similarity measure exceeds a threshold, the document is classified accordingly. In some embodiments, the classification is presented to a user for review and approval before classifying the document, while in other embodiments the document is classified without user approval. Once classified, additional classification-based processing can be performed, such as extracting data from the document based on a known structure associated with the document's classification or displaying help content related to the document's classification.

Techniques described herein improve upon conventional techniques for document classification, such as manual classification, text-based classification, and image-based classification and therefore provide a technical solution to the aforementioned technical problems associated with the conventional techniques. By allowing for accurate, automated classification of documents, techniques described herein avoid the time and inconvenience associated with manual classification. By utilizing signal representations of documents, embodiments of the present disclosure overcome the problems associated with text-based classification, particularly for documents with sparse text, by relying on a signal representation of the contents of the document rather than the words in the document for classification purposes. Furthermore, by comparing signal representations of documents rather than using image-based classification models, embodiments described herein avoid the large amounts of processing and memory resource usage associated with image-based classification models. Techniques described herein also account for differences in numbers of pages between documents in a way that is not practical with image-based classification models, due to the difficulties associated with scaling documents of differing lengths for use as inputs to an image-based classification model, through the use of signal representations of documents.

Example of Document Classification Through Signal Processing

FIG. 1 is an illustration 100 of an example document classification process flow based on signal processing.

Document 110 represents a document to be classified according to techniques described herein, such as a document imported by a user into a software application. In some embodiments, document 110 is initially received by a document classification engine in an editable document format, while in other embodiments document 110 is initially received in an image format.

An image 112 is generated based on document 110 for use in generating a signal representation 114 of the document. Generating image 112 may involve various steps such as, for instance, converting document 112 from a document format into an image format (if document 112 is initially received in a document format), converting the image to grayscale (if document 112 is not initially received in grayscale), converting gray pixels to either black or white pixels, converting the image directly to black and white (e.g., rather than converting to grayscale and then converting gray pixels to either black or white pixels), inverting pixels in the grayscale image (e.g., from black to white and from white to black), and/or additional operations to produce an image from which a signal representation can be generated. If document 110 is initially received in an image format, then generating image 112 may include performing one or more of the steps identified above to modify the image into a format from which a signal representation can be generated.

Image 112 is used to generate a signal representation 114 of document 110. In some embodiments, signal representation 114 is generated by determining a total number of pixels (e.g., black pixels or otherwise non-white pixels) in each horizontal scan line and/or vertical scan line of image 112. Generating a signal representation of a document is described in more detail below with respect to FIG. 2.

In one embodiment, signal representation 114 comprises a time-series of signal amplitudes, where the time series represents either horizontal scan lines or vertical scan lines in image 114, and the signal amplitudes represent numbers of pixels in the horizontal scan lines or vertical scan lines. It is noted that while some embodiments involve using either horizontal scan line-wise or vertical scan line-wise signal representations, other embodiments involve using both horizontal scan line-wise and vertical scan line-wise signal representations (e.g., either together such as consecutively in the same signal representation or as two separate signal representations of the document). Furthermore, if document 110 is a multi-page document, a combined image of all pages or a separate image of each page may be used to determine signal representation 114 such that signal representation 114 includes consecutive signal representations of all pages of document 110 or a combined signal representation of all pages of document 110.

Some embodiments may involve including only black pixels in the count for each horizontal scan line and/or vertical scan line, while other embodiments may involve including other non-white pixels such as gray pixels in the count. Some embodiments involve converting all gray pixels to either black or white pixels.

As described in more detail below with respect to FIG. 3, signal representation 114 may be stored as an array of values, where each index in the array represents a horizontal scan line and/or vertical scan line and the value at each index represents the number of non-white pixels in the corresponding horizontal scan line and/or vertical scan line. While some embodiments involve storing numbers of non-white pixels in each horizontal scan line or each vertical scan line in signal representation 114, other embodiments involve storing numbers of non-white pixels in each horizontal scan line and each vertical scan line in signal representation 114, such as consecutively or in combination (e.g., the value at a given index in the array is the sum of the number of non-white pixels in the horizontal scan line corresponding to the given index and the number of non-white pixels in the vertical scan line corresponding to the given index). In alternative embodiments, numbers of non-white pixels in horizontal scan lines and vertical scan lines can be stored in a matrix.

At classification step 120, document 110 is classified based on signal representation 114 in view of signal representations of documents 132 and associated classifications 134 in data store 130. Data store 130 generally represents a data storage entity such as a database or repository in which data related to document classification is stored. In particular, data store 130 includes signal representations of documents 132, which include signal representations of previously-classified documents (e.g., manually labeled with classifications) and their associated classifications 134 (e.g., the classification labels assigned to the previously-classified documents). Classifications 134 may represent document types and/or characteristics. In one example, a classification 134 indicates a type of tax form represented by a corresponding signal representation 132. Signal representations of documents 132 may be generated as described herein with respect to signal representation 114.

In order to classify document 110, signal representation 114 is compared to signal representations 132 to determine whether there is a match. Signal processing techniques may be employed to compare signal representations to one another, such as DTW techniques, which account for page number differences in multi-page documents. In DTW, sequences are warped non-linearly in the time dimension to determine a measure of their similarity independent of certain non-linear variations in the time dimension For example, DTW may be used to produce a similarity measure between signal representation 114 and each of signal representations 132. If a similarity measure between signal representation 114 and a given signal representation 132 exceeds a threshold, then a classification 134 corresponding to the given signal representation 132 is assigned to document 114. Classification 140 represents the classification of document 110 determined at the document classification step 120. DTW is just one example, and other examples are possible. For example, a Hidden Markov model, a Viterbi algorithm, a radial basis function, a radial basis function neural network, and/or the like may be used to determine similarities between signal representations. In another example, a smoothing algorithm (e.g., moving average, Savitzky-Golay algorithm, and/or the like) may be used along with dimensional reduction to preprocess signal representations, and then a simple difference comparison may be performed between the preprocessed signal representations.

Classification 140 of document 110 is then used to perform classification-based document processing 150. In one embodiment, classification-based document processing 150 includes extracting data from document 110 based on classification 140, such as using known locations of certain items of data that are associated with classification 140. In another embodiment, classification-based document processing 150 includes displaying help content related to classification 140, such as instructions related to documents of this particular classification. Classification-based document processing 150 may also include storing document 110 in a manner indicating that document 110 is associated with classification 140, such as by associating metadata with document 110.

Example Signal Representation of a Document

Figure 2:
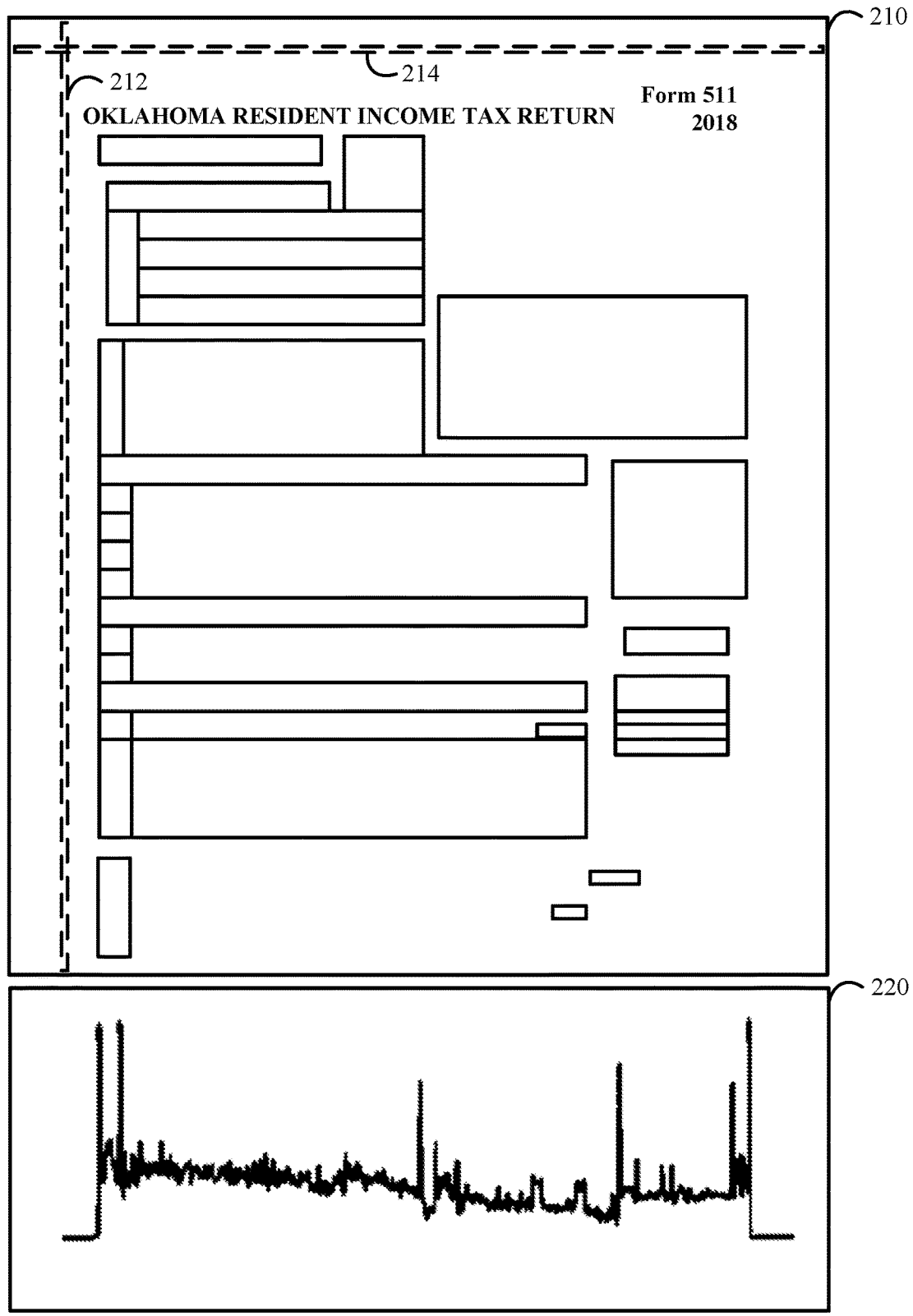
FIG. 2 depicts an example signal representation of a document.

FIG. 2 is an illustration of a signal representation 220 of a document 210.

Signal representation 220 represents numbers of non-white pixels in each vertical scan line of an image of document 210, such as vertical scan line 212. In alternative embodiments, a signal representation may also or alternatively represent numbers of non-white pixels in each horizontal scan line of an image of document 210, such as horizontal scan line 214.

Spikes in signal representation 220 correspond to vertical scan lines in the image of document 210 that include higher numbers of non-white pixels, such as vertical scan lines in which solid lines appear, while drops in signal representation 220 correspond to vertical scan lines in the image of document 110 that include fewer numbers of non-white pixels, such as blank spaces. Thus, signal representation 220 is representative of the contents and layout of document 210.

In some embodiments, gray pixels in the image of document 210 are converted to black or white pixels prior to generating signal representation 220. It may be preferable to convert gray pixels to white pixels, as gray regions in documents are typically more akin to blank spaces. Furthermore, white and black pixels in the image of document 210 may be inverted prior to generating signal representation 220.

Example Data Structure for a Signal Representation of a Document

Figure 3:
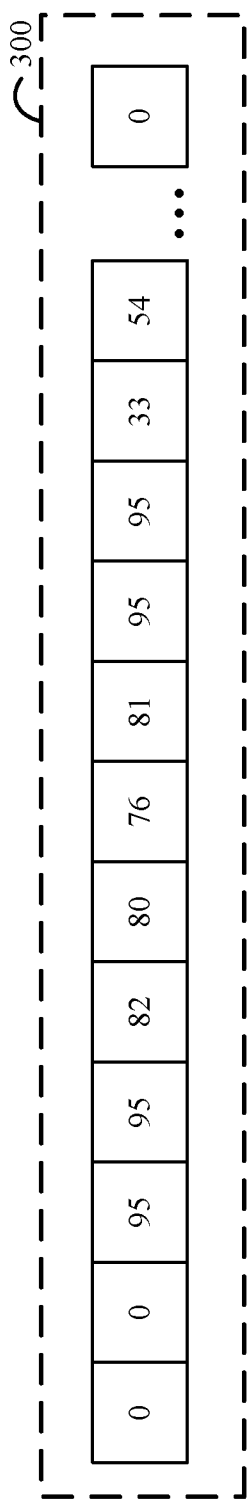
FIG. 3 depicts an example data structure for a signal representation of a document.

FIG. 3 illustrates an example data structure 300 for a signal representation of a document, such as signal representation 114 in FIG. 1.

Data structure 300 comprises a plurality of values (e.g., 0, 0, 95, 95, 82, 80, 76, 81, 95, 95, 33, 54, and so on) stored in a particular order. For instance, data structure 300 may be an array, and the value at each index of the array is representative of the number of non-white pixels in a horizontal scan line or vertical scan line corresponding to the index in the document. For example, the value in the first slot (e.g., index 0 of the array) of data structure 300 is 0, indicating that there are 0 non-white pixels in the first horizontal scan line or vertical scan line of the document. In alternative embodiment (not shown), an additional element may be included in the array indicating whether the signal representation represents horizontal scan lines, vertical scan lines, or both (e.g., as a numerical value where 0 means horizontal scan lines, 1 means vertical scan lines, and 2 means both).

A size of data structure 300 may be dependent on a resolution of the image of the document. For instance if the image of the document is 2300 pixels wide and 3500 pixels high, and a vertical scan line-wise signal representation is generated, then the corresponding data structure would consist of 2300 values, each value ranging from 0-3500. If a horizontal scan line-wise signal representation of the same document was generated based on the same image of the document, the corresponding data structure would consist of 3500 values, each value ranging from 0-2300. Furthermore, if a document has multiple pages, the signal representations of the pages may be concatenated together such that the resulting data structure stores numbers of pixels in each horizontal scan line or vertical scan line of each page of the document.

Data structure 300 is included as one example, and other types of data structures may alternatively be used to store a signal representation of a document generated according to techniques described herein.

Example Operations for Document Categorization Through Signal Processing

Figure 4:
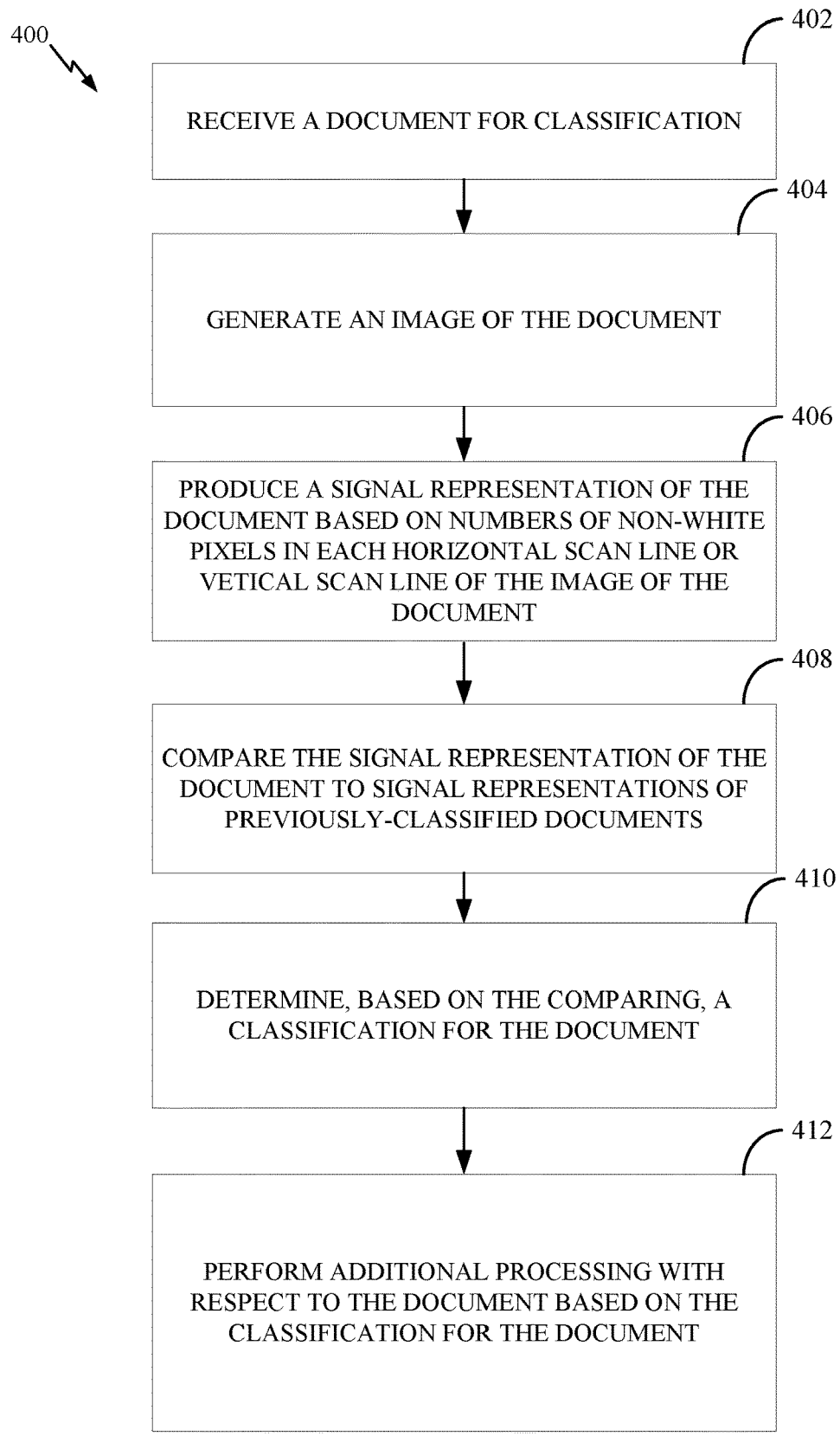
FIG. 4 depicts example operations for document classification through signal processing.

FIG. 4 depicts example operations 400 for document categorization through signal processing.

At step 402, a document for classification is received. The document may be in a document format or another format such as an image format, and may be previously unclassified.

At step 404, an image of the document is generated. For example, the document format may be converted into an image format. The image may be a grayscale image. In some embodiments, pixels in the image are inverted. In certain embodiments, gray pixels in the image are converted to either white or black pixels. For example, gray pixels may be converted to white pixels in cases where gray areas of a document represent blank spaces. In another example, gray pixels may be converted to black pixels in cases where gray pixels represent substantive content of the document. If the document is received in an image format at step 402, then step 404 may include modifying the image in one or more ways to generate a modified image of the document (e.g., by converting the image to grayscale, converting gray pixels to white or black pixels, inverting white and black pixels, and/or the like).

At step 406, a signal representation of the document is generated based on numbers of non-white pixels in each horizontal scan line or vertical scan line of the image of the document. For instance, the signal representation may be generated by using dynamic time warping (DTW) to produce a series of values representing a time series of signal amplitudes. The time series may correspond to horizontal scan lines and/or vertical scan lines of the image of the document, and the amplitudes of the signal may correspond to the numbers of non-white pixels in each horizontal scan line and/or vertical scan line of the image of the document. In some embodiments, the signal representation of the document is stored as an array of values representing the numbers of non-white pixels in each horizontal scan line and/or vertical scan line of the image of the document. In some cases, producing the signal representation of the document may be based on both a first number of non-white pixels in each horizontal scan line of the image of the document and a second number of non-white pixels in each vertical scan line of the image of the document. In some embodiments, both a vertical scan line signal representation and a horizontal scan line signal representation are generated, and both are used for comparison purposes.

At step 408, the signal representation of the document is compared to signal representations of previously-classified documents. For example, similarity measures may be determined between the signal representation of the document and signal representations of previously classified documents. In some embodiments, DTW techniques are used to determine the similarity measures.

At step 410, a classification for the document is determined based on the comparing. For example, if a similarity measure between the signal representation of the document and a signal representation of a previously-classified document exceeds a threshold (or is the highest of all similarity measures determined), or if some other comparison condition is met, then the classification of the previously-classified document may be determined to be the classification for the document.

At step 412, additional processing with respect to the document is performed based on the classification for the document. The additional processing may include, for instance, extracting data from the document based on a known structure associated with the document's classification or displaying help content related to the document's classification.

Notably, method 400 is just one example. Other embodiments of methods may include more, fewer, and/or different steps consistent with the disclosure herein.

Example Computing Systems

Figure 5A:
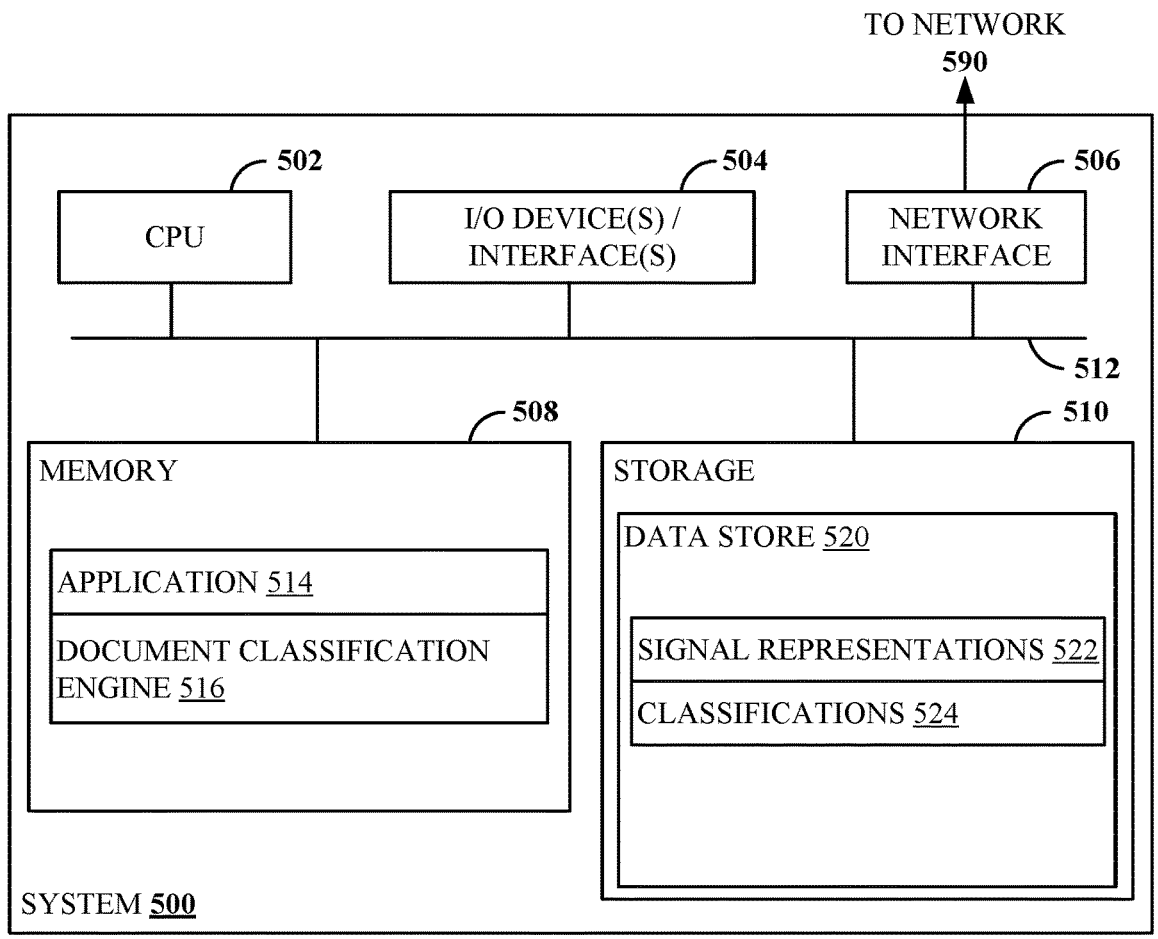
FIGS. 5A and 5B depict example processing systems for document classification through signal processing.

FIG. 5A illustrates an example system 500 with which embodiments of the present disclosure may be implemented.

For example, system 500 may be a server that performs operations such as operations 400 of FIG. 4.

System 500 includes a central processing unit (CPU) 502, one or more I/O device interfaces 504 that may allow for the connection of various I/O devices 514 (e.g., keyboards, displays, mouse devices, pen input, etc.) to the system 500, network interface 506 (connected to a network 590), a memory 508, storage 510, and an interconnect 512. It is contemplated that one or more components of system 500 may be located remotely and accessed via a network. It is further contemplated that one or more components of system 500 may comprise physical components or virtualized components.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and other arrangements.

Additionally, the memory 508 is included to be representative of a random access memory. As shown, memory 508 includes application 514 and document classification engine 516. For example, application 514 may correspond to any type of application in which documents are processed based on classifications (e.g., a financial services application or other type of data management application). For example, application 514 may perform classification-based document processing 150 of FIG. 1. Document classification engine 516 generally performs operations described herein related to classifying documents based on signal representations. For instance, document classification engine 516 may perform document classification 120 of FIG. 1, and may generate and/or utilize signal representations 522 and classifications 524.

Storage 510 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

Storage 510 comprises data store 520, which generally represents a data storage entity that stores data related to application 514 and/or document classification engine 516. Data store 520 includes signal representations 522, which generally include signal representations of classified documents, and are associated with classifications 524 (e.g., the classifications assigned to the documents represented by signal representations 522). For example, signal representations 522 may include signal representations 132 and 114 of FIG. 1 and signal representation 220 of FIG. 2, and may be stored in a manner described with respect to data structure 300 of FIG. 3. Classifications 524 may include classifications 134 and 140 of FIG. 1.

Figure 5B:
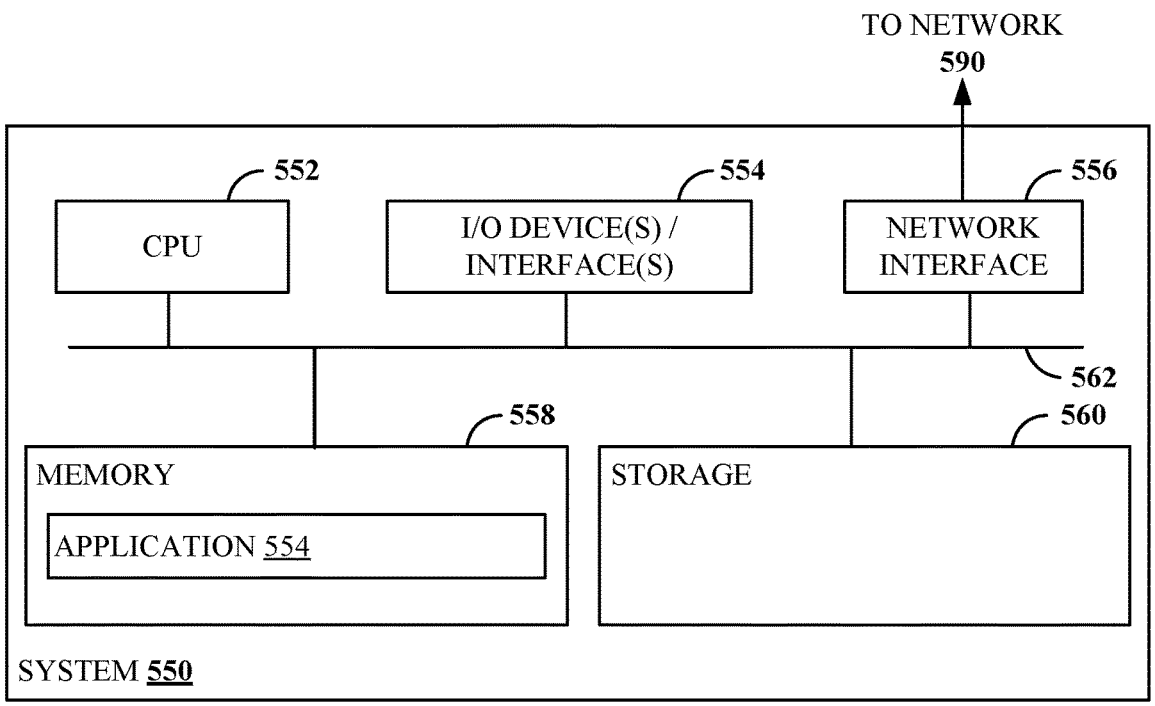

FIG. 5B illustrates another example system 550 with which embodiments of the present disclosure may be implemented. For example, system 550 may be representative of client device 130 and/or expert device 160 of FIG. 1.

System 550 includes a central processing unit (CPU) 552, one or more I/O device interfaces 554 that may allow for the connection of various I/O devices 554 (e.g., keyboards, displays, mouse devices, pen input, etc.) to the system 550, network interface 556 (connected to a network 590), a memory 558, storage 560, and an interconnect 562. It is contemplated that one or more components of system 550 may be located remotely and accessed via a network. It is further contemplated that one or more components of system 550 may comprise physical components or virtualized components.

CPU 552 may retrieve and execute programming instructions stored in the memory 558. Similarly, the CPU 552 may retrieve and store application data residing in the memory 558. The interconnect 562 transmits programming instructions and application data, among the CPU 552, I/O device interface 554, network interface 556, memory 558, and storage 560. CPU 552 is included to be representative of a single CPU, multiple CPUs, a single CPU having multiple processing cores, and other arrangements.

Additionally, the memory 558 is included to be representative of a random access memory. As shown, memory 558 includes an application 555, which may be representative of a client-side component corresponding to the server-side application 514 of FIG. 5A. For example, application 555 may comprise a user interface through which a user of system 550 interacts with application 514 of FIG. 5A. In alternative embodiments, application 555 is a standalone application that performs document classification through signal processing as described herein.

Storage 560 may be a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN).

In other embodiments, techniques described herein may be performed on a single device.

Example Clauses

Clause 1: A method for document classification through signal processing, comprising: receiving a document for classification; generating an image of the document; producing a signal representation of the document based on numbers of non-white pixels in each horizontal scan line or vertical scan line of the image of the document; comparing the signal representation of the document to signal representations of previously-classified documents; determining, based on the comparing, a classification for the document; and performing additional processing with respect to the document based on the classification for the document.

Clause 2: The method of Clause 1, wherein generating the image of the document comprises generating a grayscale image of the document.

Clause 3: The method of Clause 2, further comprising inverting pixels in the grayscale image of the document.

Clause 4: The method of any of Clause 2-3, further comprising converting gray pixels in the grayscale image of the document to white pixels.

Clause 5: The method of any of Clause 1-4, wherein producing the signal representation of the document comprises using dynamic time warping (DTW) to produce a series of values representing a time series of signal amplitudes.

Clause 6: The method of Clause 5, wherein the time series corresponds to horizontal scan lines or vertical scan lines of the image of the document, and wherein the amplitudes of the signal correspond to the numbers of non-white pixels in each horizontal scan line or vertical scan line of the image of the document.

Clause 7: The method of any of Clause 1-6, wherein the signal representation of the document is stored as an array of values representing the numbers of non-white pixels in each horizontal scan line or vertical scan line of the image of the document.

Clause 8: The method of any of Clause 1-7, wherein producing the signal representation of the document is based on a first number of non-white pixels in each horizontal scan line of the image of the document and a second number of non-white pixels in each vertical scan line of the image of the document.

Clause 9: A system for document classification through signal processing, comprising: one or more processors; and a memory storing instructions that, when executed by the one or more processors, cause the system to: receive a document for classification; generate an image of the document; produce a signal representation of the document based on numbers of non-white pixels in each horizontal scan line or vertical scan line of the image of the document; compare the signal representation of the document to signal representations of previously-classified documents; determine, based on the comparing, a classification for the document; and perform additional processing with respect to the document based on the classification for the document.

Clause 10: The system of Clause 9, wherein generating the image of the document comprises generating a grayscale image of the document.

Clause 11: The system of Clause 10, wherein the instructions, when executed by the one or more processors, further cause the system to invert pixels in the grayscale image of the document.

Clause 12: The system of any of Clause 10-11, wherein the instructions, when executed by the one or more processors, further cause the system to convert gray pixels in the grayscale image of the document to white pixels.

Clause 13: The system of any of Clause 9-12, wherein producing the signal representation of the document comprises using dynamic time warping (DTW) to produce a series of values representing a time series of signal amplitudes.

Clause 14: The system of Clause 13, wherein the time series corresponds to horizontal scan lines or vertical scan lines of the image of the document, and wherein the amplitudes of the signal correspond to the numbers of non-white pixels in each horizontal scan line or vertical scan line of the image of the document.

Clause 15: The system of any of Clause 9-14, wherein the signal representation of the document is stored as an array of values representing the numbers of non-white pixels in each horizontal scan line or vertical scan line of the image of the document.

Clause 16: The system of any of Clause 9-15, wherein producing the signal representation of the document is based on a first number of non-white pixels in each horizontal scan line of the image of the document and a second number of non-white pixels in each vertical scan line of the image of the document.

Clause 17: A method for document classification through signal processing, comprising: receiving a plurality of documents associated with classifications; generating images of the plurality of documents; producing signal representations of the plurality of documents based on numbers of non-white pixels in each horizontal scan line or vertical scan line of each image of the images of the plurality of documents; associating the classifications with the signal representations of the plurality of documents; comparing a signal representation of a previously unclassified document to the signal representations of the documents; determining, based on the comparing, a classification for the previously unclassified document; and performing additional processing with respect to the previously unclassified document based on the classification for the previously unclassified document.

Clause 18: The method of Clause 17, wherein generating the images of the plurality of documents comprises generating grayscale images of the plurality of documents.

Clause 19: The method of Clause 18, further comprising inverting pixels in the grayscale images of the plurality of documents.

Clause 20: The method of any of Clause 18-19, further comprising converting gray pixels in the grayscale images of the plurality of documents to white pixels.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for document classification through signal processing, comprising:
producing a signal representation of a document based on a number of non-white pixels in each of a plurality of horizontal or vertical scan lines in an image of the document, wherein producing the signal representation of the document comprises using dynamic time warping (DTW) to produce a series of values representing a time series of signal amplitudes;
comparing the signal representation of the document to signal representations of previously-classified documents; and
performing additional processing with respect to the document based on the comparing.

2. The method of claim 1, further comprising generating the image of the document based on generating a grayscale image of the document.

3. The method of claim 2, further comprising inverting pixels in the grayscale image of the document.

4. The method of claim 2, further comprising converting gray pixels in the grayscale image of the document to white pixels.

5. The method of claim 1, wherein the time series corresponds to the plurality of horizontal or vertical scan lines in the image of the document, and wherein the amplitudes of the signal correspond to numbers of non-white pixels in each of the plurality of horizontal or vertical scan lines in the image of the document.

6. The method of claim 1, wherein the signal representation of the document is stored as an array of values representing the number of non-white pixels in each of the plurality of horizontal or vertical scan lines in the image of the document.

7. The method of claim 1, wherein producing the signal representation of the document is based on a first number of non-white pixels in a first horizontal scan line of the image of the document and a second number of non-white pixels in a second vertical scan line of the image of the document.

8. A system for document classification through signal processing, comprising:
one or more processors; and
a memory storing instructions that, when executed by the one or more processors, cause the system to:
produce a signal representation of a document based on a number of non-white pixels in each of a plurality of horizontal or vertical scan lines in an image of the document, wherein producing the signal representation of the document comprises using dynamic time warping (DTW) to produce a series of values representing a time series of signal amplitudes;
compare the signal representation of the document to signal representations of previously-classified documents; and
perform additional processing with respect to the document based on the comparing.

9. The system of claim 8, further comprising generating the image of the document based on generating a grayscale image of the document.

10. The system of claim 9, wherein the instructions, when executed by the one or more processors, further cause the system to invert pixels in the grayscale image of the document.

11. The system of claim 9, wherein the instructions, when executed by the one or more processors, further cause the system to convert gray pixels in the grayscale image of the document to white pixels.

12. The system of claim 8, wherein the time series corresponds to the plurality of horizontal or vertical scan lines in the image of the document, and wherein the amplitudes of the signal correspond to numbers of non-white pixels in each of the plurality of horizontal or vertical scan lines in the image of the document.

13. The system of claim 8, wherein the signal representation of the document is stored as an array of values representing the number of non-white pixels in each of the plurality of horizontal or vertical scan lines in the image of the document.

14. The system of claim 8, wherein producing the signal representation of the document is based on a first number of non-white pixels in a first horizontal scan line of the image of the document and a second number of non-white pixels in a second vertical scan line of the image of the document.

15. A method for document classification through signal processing, comprising:
producing signal representations of a plurality of documents based on a number of non-white pixels in each of a plurality of horizontal or vertical scan lines in each image of a plurality of images of the plurality of documents;
associating the classifications with the signal representations of the plurality of documents;
comparing a signal representation of a previously unclassified document to the signal representations of the documents;
determining, based on the comparing, a classification for the previously unclassified document; and
performing additional processing with respect to the previously unclassified document based on the classification for the previously unclassified document.

16. The method of claim 15, further comprising generating the plurality of images of the plurality of documents based on generating grayscale images of the plurality of documents.

17. The method of claim 16, further comprising inverting pixels in the grayscale images of the plurality of documents.

18. The method of claim 16, further comprising converting gray pixels in the grayscale images of the plurality of documents to white pixels.

* * * * *